US012674428B2

(12) United States Patent
Matsushima et al.

(10) Patent No.: US 12,674,428 B2
(45) Date of Patent: Jul. 7, 2026

(54) ENGINE SYSTEM WITH COMBUSTION CONTROL FOR REDUCING COMBUSTION VARIATIONS

(71) Applicant: Mazda Motor Corporation, Aki-gun (JP)

(72) Inventors: Yuto Matsushima, Aki-gun (JP); Yuichiro Tsumura, Aki-gun (JP); Yukio Haizaki, Aki-gun (JP); Seiya Sugimoto, Aki-gun (JP); Shigeru Nakagawa, Aki-gun (JP); Shuhei Shintani, Aki-gun (JP); Masaki Miyoshi, Aki-gun (JP); Masahiro Ueki, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 0 days.

(21) Appl. No.: 19/053,990

(22) Filed: Feb. 14, 2025

(65) Prior Publication Data

US 2025/0305464 A1 Oct. 2, 2025

(30) Foreign Application Priority Data

Mar. 28, 2024 (JP) ................................ 2024-053784

(51) Int. Cl.
*F02D 41/14* (2006.01)
*F02D 13/02* (2006.01)
(Continued)

(52) U.S. Cl.
CPC ..... *F02D 41/1401* (2013.01); *F02D 13/0234* (2013.01); *F02D 35/023* (2013.01);
(Continued)

(58) Field of Classification Search
CPC ............ F02D 41/3017; F02D 41/0062; F02D 41/1401; F02D 41/40; F02D 41/18;
(Continued)

(56) References Cited

U.S. PATENT DOCUMENTS 9,228,527 B2 * 1/2016 Hellstrom ............... F02D 41/40
9,429,096 B2 * 8/2016 Hellstrom ............ F02D 35/024
(Continued)

FOREIGN PATENT DOCUMENTS

JP 6594825 B2 10/2019

*Primary Examiner* — Grant Moubry
(74) *Attorney, Agent, or Firm* — Alleman Hall LLP

(57) ABSTRACT

To reduce regular combustion variations across combustion cycles, an engine control apparatus includes: an engine that has cylinders inside of which gas exchange is performed by opening and closing an intake valve and an exhaust valve for each cylinder, and that is operated by causing a plurality of the cylinders to sequentially execute combustion cycles; a combustion control device that is attached to the engine, and controls combustion in each of the plurality of cylinders; and a controller that controls the operation of the engine by outputting a control signal to the device, wherein the controller, before combustion in each of the plurality of cylinders, estimates state quantities of the cylinder based on a plant model of the engine which indicates regular combustion variations across the combustion cycles, and outputs to the combustion control device the control signal, which has been corrected based on the estimated state quantities.

19 Claims, 13 Drawing Sheets

(51) Int. Cl.
*F02D 35/02* (2006.01)
*F02D 41/40* (2006.01)
*F02P 5/15* (2006.01)

(52) U.S. Cl.
CPC ............ *F02D 41/40* (2013.01); *F02P 5/1512* (2013.01); *F02D 2041/1417* (2013.01); *F02D 2041/1433* (2013.01)

(58) Field of Classification Search
CPC ............. F02D 13/0234; F02D 13/0215; F02D 35/023; F02D 35/028; F02D 37/02; F02D 2041/1417; F02D 2041/1433; F02P 5/1512; F02P 5/1516
See application file for complete search history.

(56) References Cited

U.S. PATENT DOCUMENTS

| | | | | |
|---|---|---|---|---|
| 9,599,053 | B2 * | 3/2017 | Long | F02D 41/04 |
| 10,240,491 | B2 * | 3/2019 | Shintani | F02M 26/01 |
| 2014/0230780 | A1 * | 8/2014 | Larimore | F02D 35/028 123/319 |
| 2019/0226443 | A1 | 7/2019 | Yoneya et al. | |

* cited by examiner

FIG. 7

| | |
|---|---|
| $T_{timing}$ | Cylinder temperature at $timing$ [K]. $timing$ represents discrete moments such as $IVO$ and combustion result $COMB$. The same applies below. |
| $\vec{n}_{timing}$ | 3 dimensional vector of gas amounts (air, burned gas, fuel) in the cylinder at $timing$[mol]. |
| $n_{timing}$ | Total amount of substance of air, burned gas and fuel within the cylinder at $timing$[mol]. |
| $n_{timing,x}$ | Amount of substance of $x$($air$, $brnd$(burned gas), $fuel$) within the cylinder at $timing$[mol]. |
| $V_{timing}$ | Cylinder volume at $timing$[m$^3$]. |
| $P_{timing}$ | Cylinder pressure at $timing$[kPa]. |
| $R$ | Gas constant[J/(K・mol)]. |
| $\vec{n}_{IN}$ | Vector of gas amounts inhaled from intake manifold into cylinder[mol]. |
| $\vec{n}_{INJ}$ | Vector of gas amounts in the injected fuel[mol]. Other than fuel component are zeros. |
| $n_{IN}$ | Total amount of substance of air, burned gas and fuel inhaled from intake manifold into cylinder[mol]. |
| $n_{INJ}$ | Fuel injection amount[mol]. |
| $E_{HT}$ | Heat transfer amount[J]. |
| $T_{wall}$ | Representative wall (intake manifold, cylinder liner, etc.) temperature related to heat transfer[K]. |
| $C_V$ | Specific heat at constant volume[J/(K・mol)]. |
| $T_{IN}$ | Intake air temperature[K]. |
| $P_{IN}$ | Intake air pressure[kPa]. |
| $T_{INJ}$ | Fuel temperature[K]. |
| $ABF$ | Air / fuel ratio[-]. |
| $M_x$ | Molar mass of $x$ ( $air$ , $brnd$ (burned gas), $fuel$)[g/mol]. |
| $\eta$ | Combustion efficiency[-]. |
| $Q_{comb}$ | Heat generation[J]. |
| MFB50 | MFB50[deg.CA ATDC]. |
| IMEP | IMEP[kPa]. |
| $W_{IMEP}$ | IMEP times displacement volume[J]. |
| $LHV$ | Lower Heating Value[MJ/kg]. |
| $P_{EXH}$ | Exhaust gas pressure[kPa]. |
| $\alpha_*$ | Parameter. The * includes a distinguishing string. |
| $\vec{\alpha}_*$ | 3 dimensional vector of parameter (air, burned gas, fuel). The * includes a distinguishing string. |

ENGINE SYSTEM WITH COMBUSTION CONTROL FOR REDUCING COMBUSTION VARIATIONS

TECHNICAL FIELD

The technology disclosed herein relates to an engine system including an engine and an engine control apparatus, the engine control apparatus including a combustion control device such as an injector, intake valvetrain, and/or spark plug, and a controller that sends a control signal to the combustion control device.

BACKGROUND ART

In JP6594825B2, a conventional internal combustion engine control apparatus is described. This internal combustion engine control apparatus performs an EGR (exhaust gas recirculation) control for returning exhaust gas to a cylinder, finds the gas temperature in the cylinder and the EGR rate in a state in which both an intake valve and an exhaust valve are closed during a combustion cycle, and corrects the ignition timing, based on the found gas temperature and EGR rate.

SUMMARY

Problems to be Solved

The conventional internal combustion engine control apparatus described in JP6594825B2 finds the gas temperature in the cylinder and the EGR rate after the intake valve is closed, and corrects the ignition timing in the combustion cycle. In other words, the conventional control apparatus measures the state quantities of the cylinder for each cycle, and corrects one or more control variables of a device.

On the other hand, the inventors of the present application have newly found that the combustion in the previous cycle affects the combustion in the following cycle, and therefore combustion variations having regularity occur (i.e., that occur in a regular pattern) as the cycles proceed. If the state quantities of the cylinder are measured for each cycle as in the conventional control apparatus, such long-term combustion variations over a plurality of combustion cycles cannot be measured, and the combustion variations cannot be reduced.

The technology disclosed herein reduces the combustion variations having regularity across combustion cycles.

Means for Solving the Problems

The technology disclosed herein relates to an engine control system. This engine control system includes: an engine that has cylinders in which gas exchange is performed by opening and closing an intake valve and an exhaust valve of each cylinder, and that is operated by causing a plurality of the cylinders to sequentially execute combustion cycles; a combustion control device that is attached to the engine, and controls combustion in each of the plurality of cylinders; and a controller that controls an operation of the engine by outputting a control signal to the combustion control device, wherein, the controller, before combustion in each of the plurality of cylinders, estimates, based on a plant model of the engine, the plant model indicating combustion variations having regularity across a plurality of the combustion cycles, state quantities of the cylinder, corrects the control signal based on the estimated state quantities, and outputs the control signal after correction to the combustion control device.

The controller controls combustion in each of the plurality of cylinders of the engine by outputting the control signal to the combustion control device. The engine is operated as the plurality of cylinders sequentially execute combustion cycles.

Before combustion in each of the plurality of cylinders, the controller can estimate, using the plant model, the state quantities of the cylinder.

The plant model indicates combustion variations having regularity (i.e., that occur in a regular pattern) across combustion cycles, which can be referred to as "regular combustion variations." The regular combustion variations across combustion cycles are caused by the influence of the combustion in a previous cycle on the combustion in a following cycle. The controller corrects one or more control variables that are used to control the combustion control device, based on the estimated state quantities of the cylinder. The controller corrects the one or more control variables for the device to reduce the regular combustion variations across the combustion cycles. As the controller outputs the corrected control signal to the device, the regular combustion variations across the combustion cycles are reduced.

Regular combustion variations across combustion cycles can occur even when the engine is in steady operation, that is, during operation in which the one or more control variables of the device are maintained constant over time. The engine control apparatus described above can reduce combustion variations during the steady operation of the engine.

The plant model may be a model that estimates the state quantities of the cylinder for each combustion cycle, and the controller may estimate, based on the plant model, a temperature, an air amount, a burned gas amount, and a fuel amount as examples of the state quantities of the cylinder.

Regular combustion variations across combustion cycles are not necessarily variations in each combustion cycle, but instead may be periodic variations over two or more combustion cycles. Even when the period of combustion variations across combustion cycles is a period composed of two or more combustion cycles, the regular combustion variations across combustion cycles are still the result of a continuation of the influence of the combustion in the previous cycle on the combustion in the following cycles. Therefore, the plant model is a model that estimates the state quantities of the cylinder for each combustion cycle. Such a plant model can be applied widely to regular combustion variations across combustion cycles, without being limited to combustion variations over a specific period. In this way, the plant model has increased versatility.

Moreover, according to the study by the inventors of the present application, it is presumed that one cause of regular combustion variations across combustion cycles is the influence of unburned fuel in the previous combustion cycle on the combustion in the following cycle through internal EGR gas. Therefore, based on the plant model, the controller estimates the temperature, the air amount, the burned gas amount, and the fuel amount as the state quantities of the cylinder. The one or more control variables of the device can be corrected based on the estimated temperature, air amount, burned gas amount, and fuel amount, thereby reducing the combustion variations across combustion cycles.

The plant model may be a combined model of a physical model related to gas exchange in the cylinder and a statistical model related to combustion in the cylinder.

Accordingly, a highly accurate plant model can be created simply.

The engine control apparatus may include a plurality of pressure sensors that are attached to the engine for each of the plurality of cylinders and that output a signal corresponding to the pressure in the each cylinder to the controller, and the controller may estimate the state quantities of the cylinder in which combustion is performed next before the intake valve of that cylinder is closed, based on the plant model and a combustion state in the cylinder which is based on the signal from the pressure sensor.

Combustion variations include not only the regular combustion variations across combustion cycles described above, but also, for example, combustion variations that occur randomly due to factors such as variations in the fuel injection amount across a plurality of cylinders. It is possible to identify the randomly occurring combustion variations by measuring the combustion state in one or more of the previous combustion cycles.

The controller measures the combustion state in the one or more previous combustion cycles, based on the signal from the pressure sensor. Consequently, before combustion in the cylinder in which combustion is performed next, the controller can identify the random combustion variation that occurred in the previous combustion cycle. The controller can also identify the regular combustion variations across combustion cycles, based on the plant model as described above. As a result, the controller can accurately estimate the state quantities of the cylinder in which combustion is performed next, before combustion in that cylinder.

After the combustion in the previous combustion cycle is finished, the controller can also estimate the state quantities of the cylinder in which combustion is performed next, based on the signal from the pressure sensor and the plant model. The controller can estimate the state quantities of that cylinder at a relatively early timing, specifically before the intake valve is closed. Being able to estimate the state quantities of the cylinder at an early timing increases the types of devices on which the controller can perform a correction control. This is advantageous in reducing regular combustion variations across combustion cycles.

The combustion state based on the signal from the pressure sensor may include an indicated mean effective pressure (IMEP) and a center of combustion (MFB50). Here, the MFB50 is the crank angle at which the mass fraction burned ratio is 50%.

According to the study by the inventors of the present application, it was confirmed, as an example of regular combustion variations across combustion cycles, a behavior in which the IMEP and MFB50 vary over a plurality of combustion cycles as if circling on a two-dimensional plane having the IMEP and MFB50 as axes. By identifying the combustion state using two parameters, IMEP and MFB50, the controller can effectively reduce the regular combustion variations across combustion cycles.

The combustion control device may include a plurality of injectors attached to the engine for each of the plurality of cylinders and that inject fuel to be supplied into each respective cylinder, and the controller may adjust the fuel injection amount of each injector, based on the estimated state quantities for the corresponding cylinder.

As described above, one cause of combustion variations across combustion cycles is the influence of unburned fuel in the previous combustion cycle on the combustion in the following cycle. In other words, if the amount of unburned fuel to be sent to the following cycle through the EGR gas is large, the combustion in that cycle is relatively good, whereas if the amount of unburned fuel to be sent to the following cycle through the EGR gas is small, the combustion in that cycle relatively deteriorates.

If the fuel injection amount is increased or decreased based on the estimated state quantities, the combustion variations across combustion cycles are reduced.

The injector may inject the fuel at least in an intake stroke before the intake valve is closed, and the controller may adjust the fuel injection amount of the injector in the intake stroke.

As described above, based on the plant model and the combustion state in the cylinder which is based on the signal from the pressure sensor, the controller can estimate the state quantities of the cylinder in which combustion is performed next before the intake valve of that cylinder is closed. Therefore, the controller can adjust the fuel injection amount of the injector, in the intake stroke before the intake valve is closed.

The combustion control device may include an intake valvetrain that changes opening and closing timings of the intake valve for each cylinder, and the controller may adjust the opening and closing timings of the intake valve for each cylinder, based on the estimated state quantities for each respective cylinder.

As described above, since the controller can estimate the state quantities of the cylinder in which combustion is performed next before the intake valve of that cylinder is closed, it is possible to realize the adjustment of the opening and closing timings of the intake valve.

The combustion control device may include a plurality of spark plugs that are attached to the engine for each of the plurality of cylinders and that ignite an air-fuel mixture in each cylinder, and the controller may adjust an ignition timing of each spark plug, based on the estimated state quantities for each corresponding cylinder.

The adjustment of the ignition timing changes the center of combustion, and is therefore effective for reducing the combustion variations.

Advantageous Effects

The engine control apparatus described above can reduce regular combustion variations across combustion cycles.

BRIEF DESCRIPTION OF DRAWINGS

FIG. 7 is a variable table related to the plant model.

DETAILED DESCRIPTION

Figure 1:
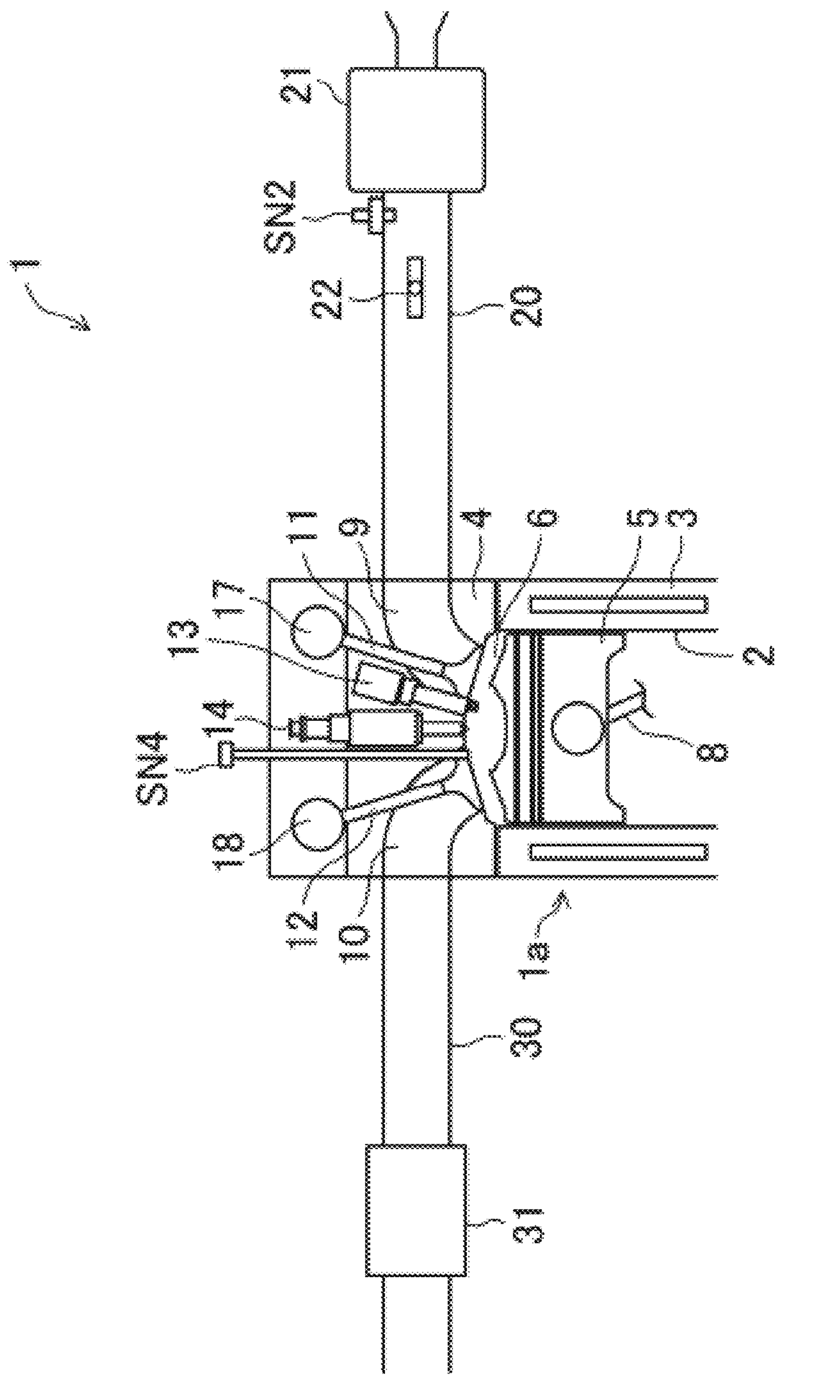
FIG. 1 shows an engine.

Hereinafter, an embodiment of an engine control system and method will be described while referring to the drawings. The engine control system and method described herein is an illustrative example.

(Configuration of Engine)

Figure 2:
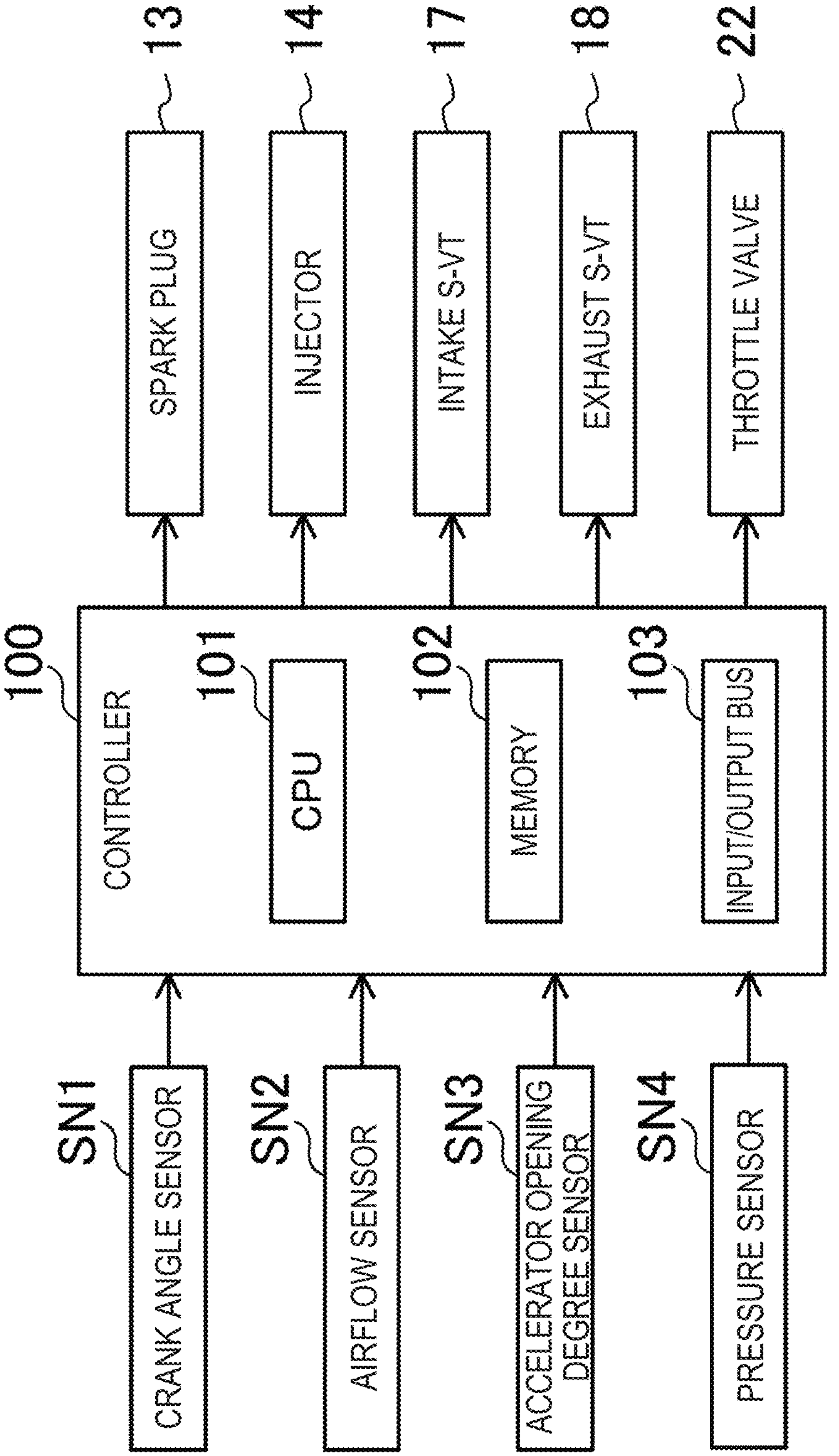
FIG. 2 is a block diagram of an engine control apparatus.

FIG. 1 shows an engine 1 of an engine system according to one disclosed embodiment. FIG. 2 is a block diagram of an engine control apparatus for the engine 1 of the engine system disclosed herein. The engine 1 is mounted on an automobile (not shown). The engine 1 is a drive source for the automobile to travel. The engine 1 is an internal combustion engine operated by being supplied with, for example, fuel containing gasoline.

The engine 1 has an engine body 1*a* including a cylinder 2. The engine body 1*a* includes a plurality of cylinders 2. The plurality of cylinders 2 are arranged in a line in a direction, for example, orthogonal to the plane of FIG. 1.

The engine body 1*a* includes a cylinder block 3 in which the cylinders 2 are formed, and a cylinder head 4 located above the cylinder block 3. A piston 5 is fitted in each cylinder 2 so as to be movable in a reciprocating manner. The piston 5 is connected to a crankshaft through a connecting rod 8. A combustion chamber 6 is formed by the cylinder 2, the cylinder head 4, and the piston 5. With the reciprocating motion of the piston 5, the cylinder 2 repeats a combustion cycle including an intake stroke, a compression stroke, an expansion stroke, and an exhaust stroke. The engine 1 is operated as the plurality of cylinders 2 sequentially execute the combustion cycles.

The cylinder head 4 has an intake port 9 and an exhaust port 10. The intake port 9 is connected to an intake passage 20. The intake port 9 is the port for introducing gas supplied from the intake passage 20 into the cylinder 2. The exhaust port 10 is connected to an exhaust passage 30. The exhaust port 10 is a port for guiding exhaust gas from the cylinder 2 to the exhaust passage 30.

The engine 1 has an intake valve 11 and an exhaust valve 12. The intake valve 11 opens and closes the intake port 9. The exhaust valve 12 opens and closes the exhaust port 10.

The engine 1 has an intake valvetrain. The intake valvetrain moves the intake valve 11. The intake valvetrain of the present embodiment includes an intake S-VT (Sequential Valve Timing) 17. The intake S-VT 17 is electrically or hydraulically driven to continuously change the rotational phase of an intake camshaft relative to the crankshaft within a predetermined angle range. The opening timing and the closing timing of the intake valve 11 are continuously changed to the advanced side or the retarded side while keeping the opening period of the intake valve 11 constant. Note that the intake S-VT 17 is not limited to the above-described structure.

The engine 1 has an exhaust valvetrain. The exhaust valvetrain moves the exhaust valve 12. The exhaust valvetrain of the present embodiment includes an exhaust S-VT 18. The exhaust S-VT 18 is electrically or hydraulically driven to continuously change the rotational phase of an exhaust camshaft relative to the crankshaft within a predetermined angle range. The opening timing and the closing timing of the exhaust valve 12 are continuously changed to the advanced side or the retarded side by the exhaust S-VT 18 while keeping the opening period of the exhaust valve constant. Note that the exhaust S-VT 18 is not limited to the above-described structure.

As described above, the intake passage 20 is connected to the intake port 9. An air cleaner 21 is disposed at an upstream end of the intake passage 20. The air cleaner 21 filters fresh air. The air that has passed through the air cleaner 21 is supplied to the cylinder 2 through the intake passage 20 and the intake port 9.

An airflow sensor SN2 is located downstream of the air cleaner 21 in the intake passage 20. The airflow sensor SN2 outputs a signal corresponding to an airflow rate in the intake passage 20.

A throttle valve 22 is located downstream of the airflow sensor SN2 in the intake passage 20. The throttle valve 22 changes the size of the passing cross-sectional area of the intake passage 20.

As described above, the exhaust passage 30 is connected to the exhaust port 10. A catalytic device 31 is located midway in the exhaust passage 30. The catalytic device 31 purifies the exhaust gas exhausted from the cylinder 2. The catalytic device 31 includes, for example, a three-way catalyst. The three-way catalyst oxidizes HC and CO, and reduces $NO_x$, thereby removing emissions included in the exhaust gas. Note that the catalytic device 31 is not limited to the three-way catalyst.

The engine 1 has a spark plug 13. The spark plug 13 is attached to the cylinder head 4, for each cylinder 2. The spark plug 13 forcibly ignites an air-fuel mixture in the combustion chamber 6. The ignition timing of the spark plug 13 is specified by a controller 100 which will be described later.

The engine 1 has an injector 14. The injector 14 is attached to the cylinder head 4, for each cylinder 2. The injector 14 injects an amount of fuel specified by the controller 100 into the combustion chamber 6 at a predetermined timing.

The engine control apparatus has the controller 100 as shown in FIG. 2. The controller 100 controls the operation of the engine 1. The controller 100 is a control unit based on a well-known microcomputer. The controller 100 includes a CPU 101, a memory 102, and an input/output bus 103. The CPU 101 is a central processing unit that executes computer programs. The computer programs include a basic control program such as an OS, and an application program that is activated on the OS to realize specific functions. The memory 102 stores various kinds of computer programs, or data for use in executing the computer programs. The computer program is a control program for controlling the engine 1. The memory 102 is provided with a processing area, which is used when the CPU 101 performs a series of processes. The input/output bus 103 is for inputting and outputting electrical signals to and from the controller 100.

The airflow sensor SN2 described above is electrically connected to the controller 100. The airflow sensor SN2 outputs a signal to the controller 100. Moreover, a crank angle sensor SN1, an accelerator opening degree sensor SN3, and a pressure sensor SN4 are electrically connected to the controller 100. The crank angle sensor SN1 is attached to the cylinder block 3, and outputs a signal corresponding to the rotation of the crankshaft to the controller 100. The accelerator opening degree sensor SN3 is attached to an accelerator pedal mechanism, and outputs a signal corresponding to an operation amount on the accelerator pedal to the controller 100. The pressure sensor SN4 is attached to the cylinder head 4, for each cylinder 2 as shown in FIG. 1. The pressure sensor SN4 outputs a signal corresponding to the pressure in the cylinder 2 to the controller 100. The controller 100 receives the signals from these sensors SN1 to SN4.

The controller 100 determines the state of the engine 1, based on the signals from the sensors SN1 to SN4, and outputs control signals to the spark plug 13, the injector 14, the intake S-VT 17, the exhaust S-VT 18, and the throttle valve 22. The controller 100 controls the operation of the engine 1 by outputting the control signals to the respective devices.

Figure 3:
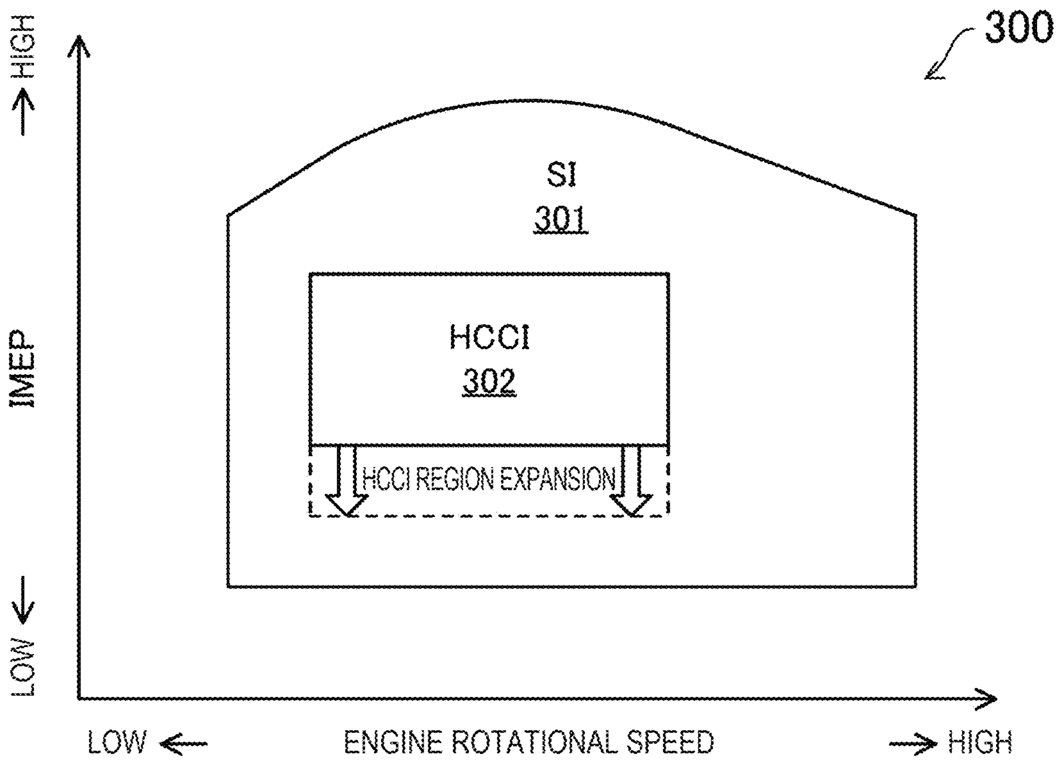
FIG. 3 shows an operating range map of the engine.

FIG. 3 shows a map 300, as an example, related to the control of the engine 1. The map 300 is stored in the memory 102 of the controller 100.

The map 300 is defined by the IMEP (indicated mean effective pressure) and the rotational speed of the engine 1. The map 300 includes two regions, a first region 301 and a second region 302. More specifically, the first region 301 is the region in which the air-fuel mixture in the cylinder 2 is burned by spark ignition, or, in other words, an spark ignition (SI) region. The second region 302 is the region in which the air-fuel mixture in the cylinder 2 is burned by compression ignition, or, in other words, an homogeneous charge compression ignition (HCCI) region. The second region 302 is a region from low rotation to medium rotation and a medium load region within the entire operating range of the engine 1. The first region 301 is the region excluding the second region 302.

Next, a basic control of the engine 1 will be briefly described. The controller 100 sets a target IMEP and a target rotational speed for the engine 1, based on the signals from the crank angle sensor SN1, the airflow sensor SN2 and the accelerator opening degree sensor SN3 described above, and determines, based on the map 300 in FIG. 3, an operating range according to the set target IMEP and target rotational speed. Then, according to the determined operating range, the ECU 100 changes the opening and closing timings of the intake valve 11 and the exhaust valve 12, the fuel injection timing and injection amount, whether or not to perform ignition, and the ignition timing.

More specifically, when the operating state of the engine 1 is in the first region 301, the intake S-VT 17 opens and closes the intake valve 11 at the predetermined timings, and the exhaust S-VT 18 opens and closes the exhaust valve 12 at the predetermined timings. The injector 14 injects the fuel into the cylinder 2 during the intake stroke and/or the compression stroke. The spark plug 13 ignites the air-fuel mixture near the compression top dead center.

On the other hand, when the operating state of the engine 1 is in the second region 302, the intake S-VT 17 opens and closes the intake valve 11 at the predetermined timings, and the exhaust S-VT 18 opens and closes the exhaust valve 12 at the predetermined timings. The injector 14 injects the fuel into the cylinder 2 during the intake stroke. The spark plug 13 does not ignite the air-fuel mixture. The air-fuel mixture is self-ignited by compression near the compression top dead center, and is burned.

This engine 1 performs HCCI combustion in some operating range, and therefore has high fuel efficiency. However, HCCI combustion is limited to a narrow range due to knocking or misfiring. The low-load side limit in the second region 302 is limited because the temperature in the cylinder 2 cannot reach a self-ignition temperature, and a misfire occurs. For example, if an internal exhaust gas recirculation (EGR) gas is introduced into the cylinder 2, the temperature in the cylinder 2 can be increased, and, as shown by the white arrows in FIG. 3, there is a possibility of expanding the second region 302 toward the low-load side. However, if the amount of EGR gas introduced into the cylinder 2 is too large, variation in fuel increases. The expansion of the second region 302 is limited due to the increase in variation in fuel.

(Regular Combustion Variations Across Combustion Cycles)

Figure 4:
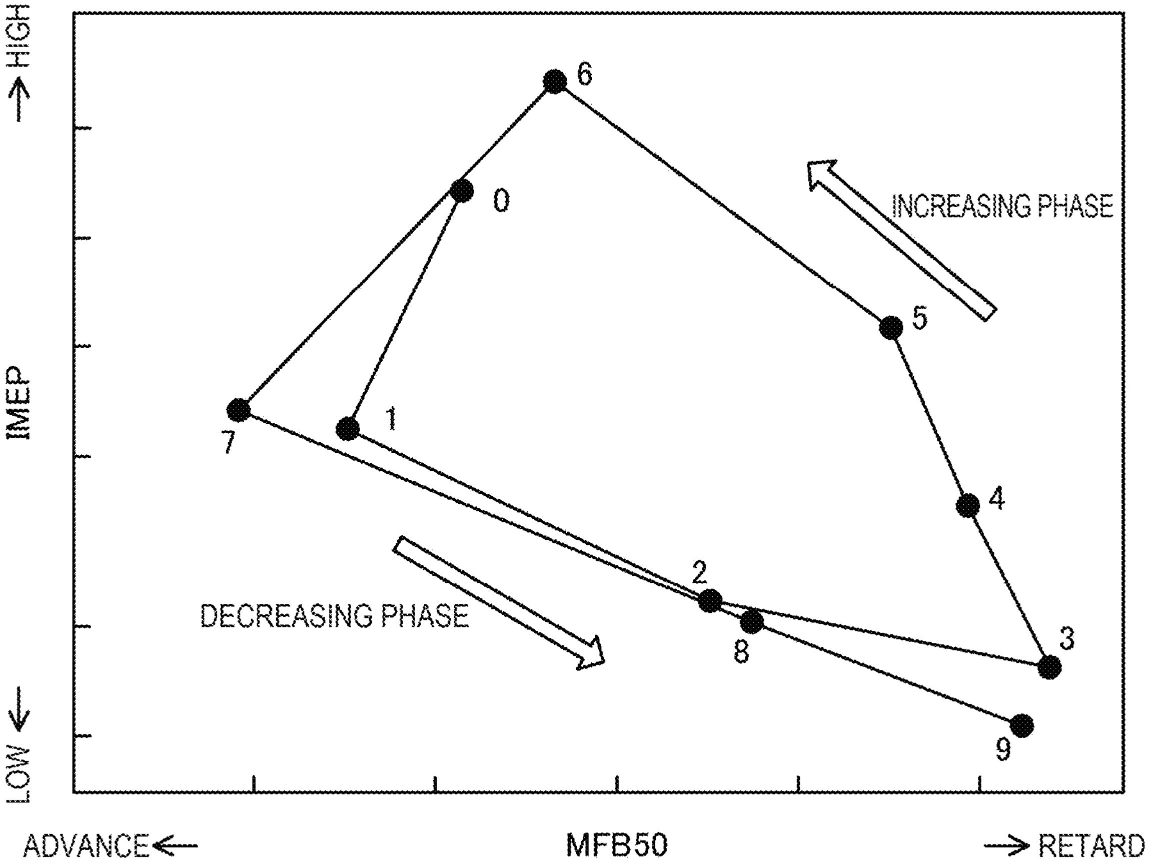
FIG. 4 shows combustion variations having regularity (i.e., regular combustion variations) across combustion cycles.

The inventors of the present application confirmed combustion variations when the engine 1 was operated under a condition in which the amount of EGR gas flowing into the cylinder 2 was increased. Note that the engine 1 is operated lean with an excess air ratio A in an air-fuel mixture that is higher than 1, and by HCCI combustion. FIG. 4 employs the indicated mean effective pressure (IMEP) and the center of combustion (MFB50) as indexes of combustion variations, and shows the IMEP and MFB50 of each combustion cycle on a two-dimensional plane by indicating the IMEP on the vertical axis, and the MFB50 on the horizontal axis. Note that the numbers 1, 2, . . . in FIG. 4 indicate the order of the combustion cycles. It can be understood from FIG. 4 that, as the combustion proceeds from combustion cycle 1 to combustion cycle 2 and combustion cycle 3, the IMEP is gradually decreased and the MFB50 is gradually retarded. Moreover, it can be understood that, as the combustion proceeds to combustion cycle 3, combustion cycle 4, combustion cycle 5 and combustion cycle 6, contrary to the above, the IMEP is gradually increased and the MFB50 is gradually advanced. Then, the IMEP and MFB50 of combustion cycle 7 are close to the IMEP and MFB50 of combustion cycle 1. In other words, the combustion cycles 1, 2 and 3 are in a decreasing phase in which the IMEP is decreased and the MFB50 is retarded, while the combustion cycles 4, 5 and 6 are in an increasing phase in which the IMEP is decreased and the MFB50 is retarded. In this case, the IMEP and MFB50 vary in a counterclockwise circling pattern in FIG. 4 over a plurality of combustion cycles.

The inventors of the present application confirmed, based on statistical values of autocorrelation coefficients in all combustion cycles, that combustion variations over a period of six combustion cycles occurred under the operating conditions shown in FIG. 4. In FIG. 4, the IMEP and MFB50 of the combustion cycle 7 are close to the IMEP and MFB50 of the combustion cycle 1, the IMEP and MFB50 of the combustion cycle 8 are close to the IMEP and MFB50 of the combustion cycle 2, and the IMEP and MFB50 of the combustion cycle 9 are close to the IMEP and MFB50 of the combustion cycle 3.

Figure 5:
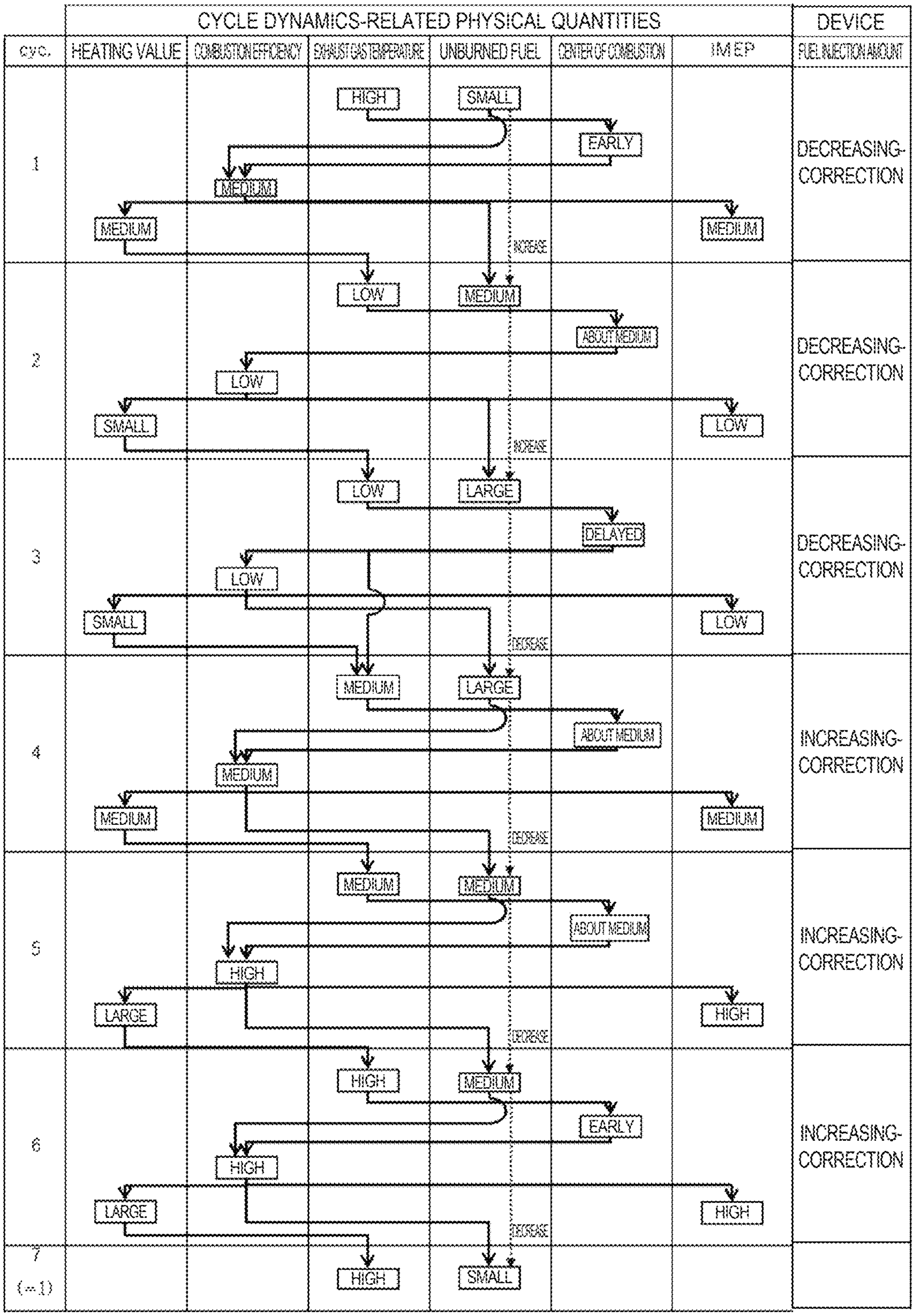
FIG. 5 shows an example of a mechanism of occurrence of the regular combustion variations.

The inventors of the present application make the following speculation about the mechanism of occurrence of combustion variations having regularity (i.e., that occur in a regular pattern) across combustion cycles. FIG. 5 is a view for explaining the mechanism of occurrence of combustion variations. The numbers 1, 2, . . . on the left side in FIG. 5 correspond to the combustion cycle numbers in FIG. 4.

In the combustion cycle 1, as the high-temperature EGR gas is drawn into the cylinder 2 in a state in which the unburned fuel amount in the EGR gas is small, combustion is performed at an advanced ignition timing. The center of combustion in the combustion cycle 1 is on the advanced side, and the combustion efficiency, the heating value and the IMEP are about medium (i.e. average). The temperature of exhaust gas by combustion in the combustion cycle 1 is decreased to a certain extent due to an increase in cooling loss, and the unburned fuel amount in the exhaust gas increases relative to the previous cycle.

In the combustion cycle 2, since the exhaust gas with a lower temperature from the combustion cycle 1 is drawn into the cylinder 2, combustion is performed at a retarded ignition timing. Since the center of combustion in the combustion cycle 2 is retarded relative to the combustion cycle 1 and the combustion efficiency is decreased, each of the heating value and the IMEP is decreased. The temperature of exhaust gas by combustion in the combustion cycle 2 is decreased to a certain extent due to the small heating value, and the unburned fuel amount in the exhaust gas increases.

In the combustion cycle 3, the exhaust gas with the low temperature from the combustion cycle 2 is drawn into the cylinder 2, and therefore the ignition timing is further retarded. Although the combustion efficiency further deteriorates, some unburned fuel contained in large amounts in the EGR gas is burned, and therefore the decrease in the heating value and the IMEP is smaller, and the exhaust gas temperature is increased to a certain extent due to a reduction in cooling loss. The unburned fuel amount in the exhaust gas slightly decreases.

In the combustion cycle 4, the temperature of the EGR gas is relatively high and there is a large amount of unburned fuel in the EGR gas, and therefore the ignition timing is advanced to a certain extent. However, the ignition timing is not so early as to completely burn all of the unburned fuel in the EGR gas, and, consequently, the heating value and the IMEP are average levels. The exhaust gas temperature increases, and the unburned fuel amount in the exhaust gas decreases.

In the combustion cycle 5, similarly to the combustion cycle 4, since the temperature of the EGR gas is high and the unburned fuel amount in the EGR gas is large, the ignition timing is further advanced, and the heating value and the IMEP are further increased. Since the cooling loss is small, the exhaust gas temperature is relatively high, and some unburned fuel is carried over to the next combustion cycle.

In the combustion cycle 6, since the temperature of the EGR gas is relatively high and the unburned fuel amount is relatively large, the ignition timing is further advanced. Since the ignition timing is sufficiently early, all the remaining unburned fuel is burned, and the heating value and the IMEP are increased. Since the exhaust gas temperature further increases and the unburned fuel amount in the EGR gas is small, the next combustion cycle is substantially the same as the combustion cycle 1.

It is considered that the regular combustion variations across combustion cycles described above are caused by the influence of fluctuating exhaust gas temperatures and fluctuating unburned fuel amounts by way of the internal EGR gas on the combustion in subsequent combustion cycles, over the course of a plurality of combustion cycles.

The technology disclosed herein reduces such regular combustion variations across combustion cycles.

Note that regular combustion variations across combustion cycles are not limited to combustion variations over the period of six combustion cycles described above. The period of combustion variations can be various periods. Moreover, combustion variations may have a regularity that is not periodic. The technology disclosed herein can be widely applied to reduce the regular combustion variations across combustion cycles.

(Control for Reducing Regular Combustion Variations Across Combustion Cycles)

(Plant Model)

Figure 6:
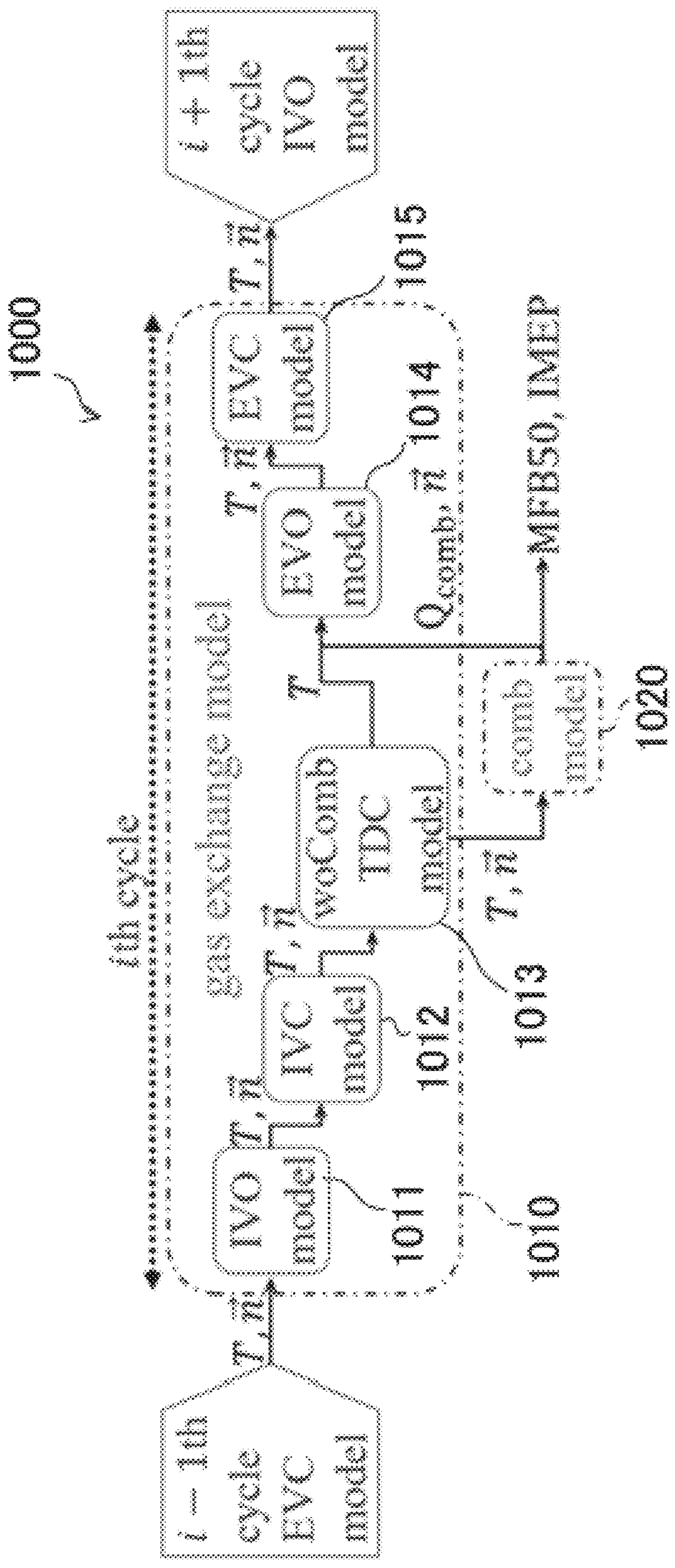
FIG. 6 shows a plant model of the engine.

In order to reduce regular combustion variations across combustion cycles described above, the inventors of the present application created a plant model for the engine 1, which indicates the combustion variations. FIG. 6 shows a plant model 1000 for the engine 1. The combustion variations described above are combustion variations of a period of six combustion cycles, and the combustion variations across combustion cycles result from the continuous influence of the combustion in the previous cycle on the combustion in the following cycles. Therefore, the plant model 1000 is a model for estimating the state quantities of the cylinder 2 for each combustion cycle. The application of such a plant model 1000 is not limited to combustion variations over a specific period, and is highly versatile.

In order to enable estimation of the temperature and the unburned fuel amount in the cylinder 2 related to the mechanism of combustion variations described above, the plant model 1000 is configured such that the temperature and the amount of substance in the cylinder 2 are treated as in-cylinder state quantities, and the combustion result in the previous combustion cycle transmits information to the in-cylinder state quantities of the next combustion cycle through the internal EGR.

In consideration of simplification of the plant model 1000, the plant model 1000 is a combined model of a gas exchange model and a combustion model. A gas exchange model 1010 is a physical model, and a combustion model 1020 is a statistical model.

Moreover, regarding changes in state quantities within one cycle, the physics to be considered for each opening/closing event of the intake valve 11 and the exhaust valve 12 is significantly different. Therefore, for the gas exchange model 1010, as shown in FIG. 6, individual models 1011, 1012, 1013, 1014, and 1015 for finding the state quantities at discrete timings in one combustion cycle were created. The plant model 1000 has a structure in which these models 1011, 1012, 1013, 1014, 1015, and 1020 are coupled to express phenomena in one combustion cycle in total.

The intake valve opening (IVO) model 1011, the intake valve closing (IVC) model 1012, the without combustion top dead center (woCombTDC) model 1013, the combustion model 1020, the exhaust valve opening (EVO) model 1014, and the exhaust valve closing (EVC) model 1015 are specifically described below. Note that FIG. 7 shows variables included in the models.

*IVO* model 1011

[Expression 1]

$$\vec{n}_{EVC} = \vec{n}_{IVO}$$

$$P_{IVO} = P_{EVC}\left(V_{IVO}/V_{EVC}\right)^{\alpha_{\gamma 1}}$$

$$T_{IVO} = (P_{IVO} V_{IVO})/(n_{IVO} R)$$

*IVO* model 1012

[Expression 2]

$$\vec{n}_{IVC} = \vec{n}_{IN} + \vec{n}_{IVO} + \vec{n}_{INJ}$$

$$n_{IVC} C_V T_{IVC} = n_{IN} C_V T_{IN} + n_{IVO} C_V T_{IVO} + n_{INJ} C_V T_{INJ} + \alpha_{MISC} + E_{HT}$$

$$E_{HT} = \alpha_{HT} n_{IVO}(T_{IVO} - T_{watt})$$

$$P_{IVC} = \alpha_{P_{IN}} P_{IN}$$

$$T_{IVC} = (P_{IVC} V_{IVC})/(R\, n_{IVC})$$

*woCombTDC* model 1013

[Expression 3]

$$\vec{n}_{vcTDC} = \vec{n}_{IVC}$$

$$T_{vcTDC} = T_{IVC}\left(V_{IVC}/V_{TDC}\right)^{\alpha_{\gamma 2}-1}$$

Combustion model 1020

[Expression 4]

$$MFB50 = \vec{\alpha}_{n_{IVC},MFB50} \cdot \vec{n}_{IVC} + \alpha_{T_{vcTDC},MFB50}\, T_{vcTDC} + \alpha_1$$

$$IMEP = \alpha_{MFB50} MFB50 + \alpha_\eta \eta + \alpha_3$$

$$\eta = 1/\left(1 + \exp\left(-\vec{\alpha}_{n_{IVC},\eta} \cdot \vec{n}_{IVC}/V_{MFB50} - \alpha_{T_{vcTDC},\eta}\, T_{vcTDC} - \alpha_{MFB0,\eta} MFB50 - \alpha_2\right)\right)$$

-continued $$n_{COMB,air} = n_{IVC,air} - (n_{IVC,fuel}\eta\, M_{fuel} ABF)/M_{air}$$

$$n_{COMB,brnd} = n_{IVC,brnd} + (n_{IVC,fuel}\eta\, M_{fuel}(ABF+1))/M_{brnd}$$

$$n_{COMB,fuel} = (1-\eta)\, n_{IVC,fuel}$$

$$Q_{COMB} = \eta\, LHV\, n_{IVC,fuel} M_{fuel} \times 10^{-3}$$

*EVO* model 1014

$$\vec{n}_{EVO} = \vec{n}_{COMB} \quad \text{[Expression 5]}$$

$$T_{EVO} = T_{IVC}\left(V_{IVC}/V_{EVO}\right)^{\alpha_{\gamma 3}-1} + \alpha_Q (Q_{COMB} - W_{IMEP})/(C_V n_{EVO})$$

*EVC* model 1015

$$P_{EVC} = \alpha_{P_{EXH}} P_{EXH} \quad \text{[Expression 6]}$$

$$T_{EVC} = \alpha_{EVC} T_{EVO}\left(P_{EVC}/P_{EVO}\right)^{(\alpha_{\gamma 4}-1)/\alpha_{\gamma 4}}$$

$$n_{EVC} = \left(P_{EVC}/V_{EVC}\right)/(R\, T_{EVC})$$

$$\vec{n}_{EVC} = \left(n_{EVC}/n_{EVO}\right)\vec{n}_{EVO}$$

The inventors of the present application have confirmed that the plant model 1000 described above reproduces regular combustion variations across combustion cycles.

Note that the above models are examples, and the technology disclosed herein is not limited to the above models.

(Control Block of Engine)

Figure 8:
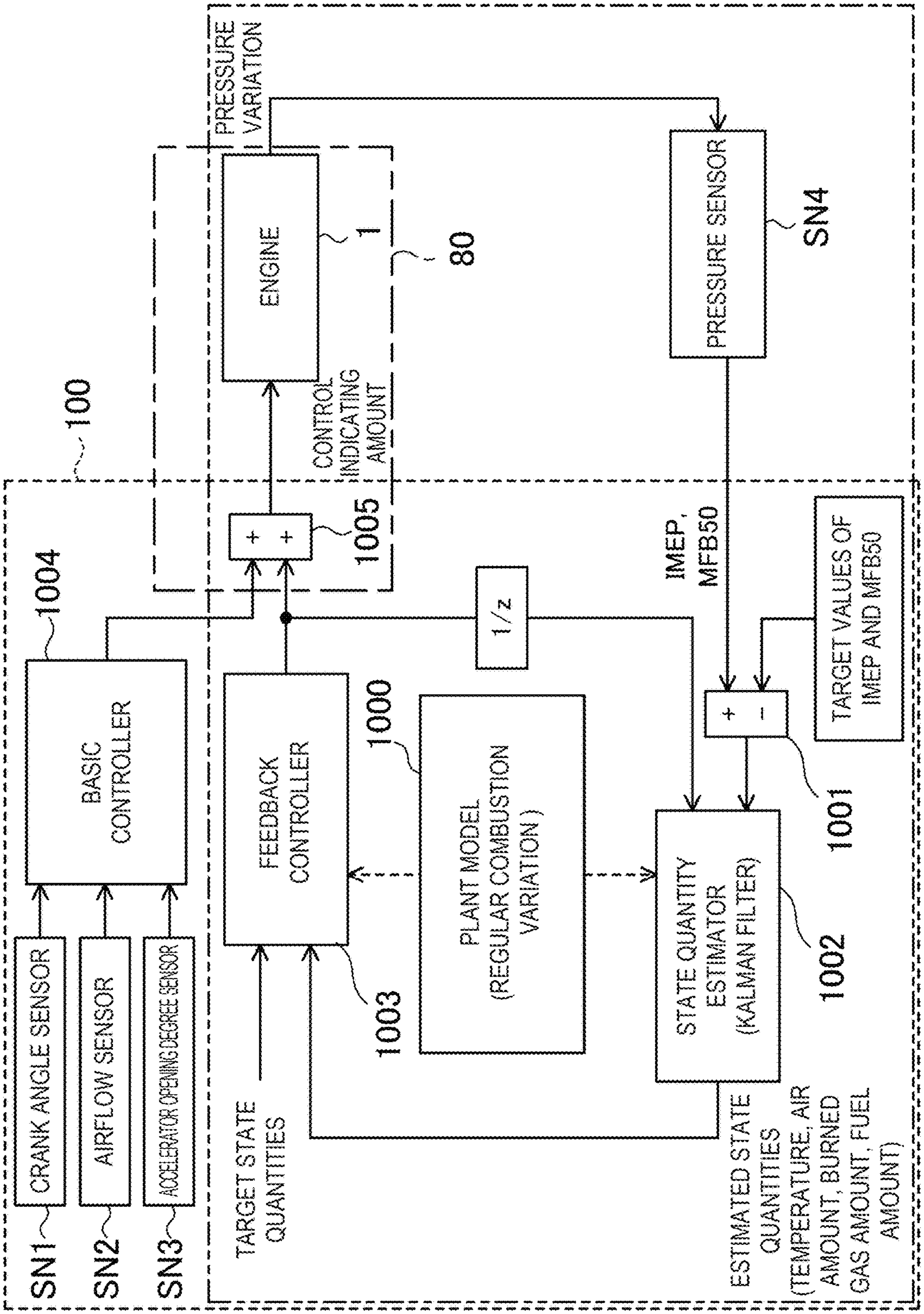
FIG. 8 is a control block diagram of a controller.

FIG. 8 shows a block diagram of the engine system, showing control flow for control of the engine 1 by the controller 100. A section enclosed by the dashed lines in FIG. 8 corresponds to the controller 100. In FIG. 8, a section enclosed by the two-dot and dash line is related to a control for reducing regular combustion variations across combustion cycles. The control of the engine 1 is a feedback control that estimates, from the combustion state of the engine 1 in the previous combustion cycle, the state quantities in the cylinder 2 in the next combustion cycle, and outputs, to a device, a control signal revised based on the estimated state quantities to reduce the variations in the IMEP and MFB50.

As described above, the controller 100 outputs a control indicating an amount to the engine 1. The engine 1 is operated as the plurality of cylinders 2 of the engine 1 sequentially execute the combustion cycles. The pressure sensor SN4 outputs a signal corresponding to a pressure variation in each of the plurality of cylinders 2 to the controller 100.

The controller 100 calculates the IMEP and MFB50 as indexes of the combustion state of each of the plurality of cylinders 2, based on the signal from the pressure sensor SN4, and inputs the calculated IMEP and MFB50 to a subtractor 1001. The subtractor 1001 inputs the differences between the measured IMEP and MFB50 and target IMEP and MFB50 to a state quantity estimator 1002.

The state quantity estimator 1002 is a Kalman filter created using the plant model 1000. The inputs to the state quantity estimator 1002 are the IMEP and MEB50 measured by the pressure sensor SN4, the target IMEP and MFB50, and the output of a later-described feedback controller 1003, and are delayed control values of the feedback controller 1003. The delay control values are labeled 1/z in FIG. 8, where z is the delay operator, to represent that the feedback control provides values from a prior timestep to the Kalman filter. The state quantity estimator 1002 estimates state quantities of the next combustion cycle, namely the temperature, the air amount, the burned gas amount, and the fuel amount in the cylinder 2, and outputs the estimated state quantities. The temperature in the cylinder 2 is the temperature in the cylinder 2 at the timing when the intake valve 11 is closed, the air amount is the amount of air in the cylinder 2 at the timing when the intake valve 11 is closed, the burned gas amount is the amount of burned gas in the cylinder 2 at the timing when the intake valve 11 is closed, and the fuel amount is the amount of fuel in the cylinder 2 at the timing when the intake valve 11 is closed.

The feedback controller 1003 receives, as the inputs, the estimated state quantities, which are the output of the state quantity estimator 1002, and the target state quantities, and outputs a correction amount for one or more control variables of the device, based on the state estimated quantities and the target state quantities, to reduce variations in the IMEP and MFB50, in other words, to maintain the state quantities in the cylinder 2 constant without being varied across combustion cycles. The feedback controller 1003 is an optimal regulator. The feedback controller 1003 is also created using the plant model 1000.

The controller 100 also includes a basic controller 1004. The basic controller 1004 is equivalent to a so-called conventional controller. The basic controller 1004 sets target torque based on signals from the crank angle sensor SN1, the airflow sensor SN2 and the accelerator opening degree sensor SN3, and outputs control variables for the devices of the engine 1 to realize the target torque.

Figure 9:
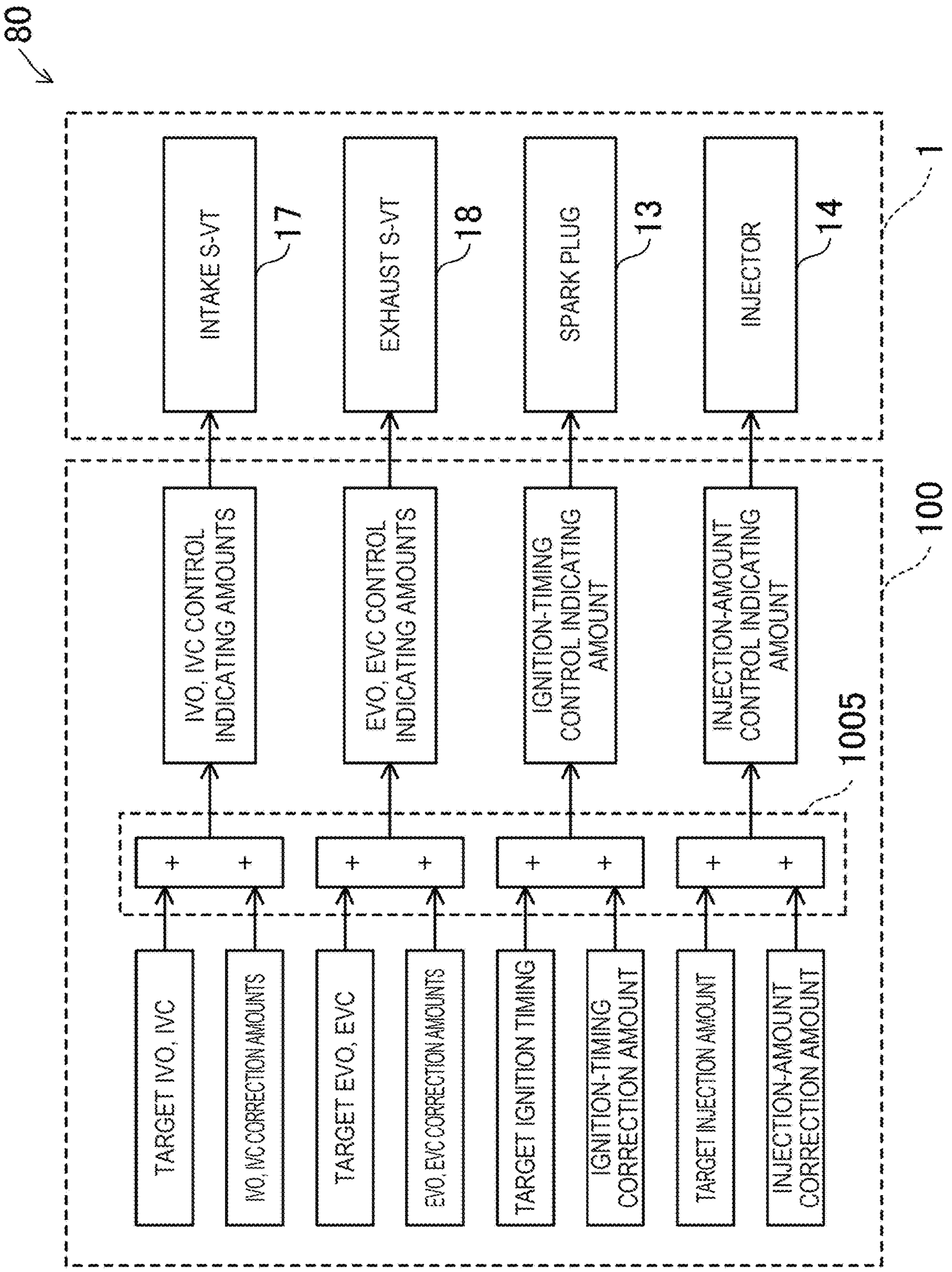
FIG. 9 shows a partial configuration of a control block.

FIG. 9 shows the configuration of a section 80 enclosed by the one-dot and dash line in FIG. 8. The controller 100 outputs control indicating amounts to the intake S-VT 17, the exhaust S-VT 18, the spark plug 13, and the injector 14 as the devices related to combustion in the engine 1.

More specifically, the basic controller 1004 outputs target IVO and IVC, which are the opening and closing timings of the intake valve 11, target EVO and EVC, which are the opening and closing timings of the exhaust valve 12, a target ignition timing, which is the ignition timing of the spark plug 13, and a target injection amount, which is the fuel injection amount of the injector 14.

Further, the feedback controller 1003 outputs IVO and IVC correction amounts, EVO and EVC correction amounts, an ignition-timing correction amount, and a fuel injection-amount correction amount.

An adder 1005 adds up each of the target amounts and the correction amounts to set indicating amounts. The controller 100 outputs IVO and IVC control indicating amounts to the intake S-VT 17, EVO and EVC control indicating amounts to the exhaust S-VT 18, an ignition-timing control indicating amount to the spark plug 13, and a fuel-injection-amount control indicating amount to the injector 14.

The intake S-VT 17 sets the rotational phase of the intake camshaft to achieve the indicated IVO and IVC, and the exhaust S-VT 18 sets the rotational phase of the exhaust camshaft to achieve the indicated EVO and EVC. The injector 14 injects the indicated amount of fuel into the cylinder 2 at a specified timing in the intake stroke and/or the compression stroke, and the spark plug 13 ignites the air-fuel mixture in the cylinder 2 at the indicated timing. Note that, when the engine 1 performs HCCI combustion, the controller 100 does not output the control indicating amount to the spark plug 13.

Figure 10:
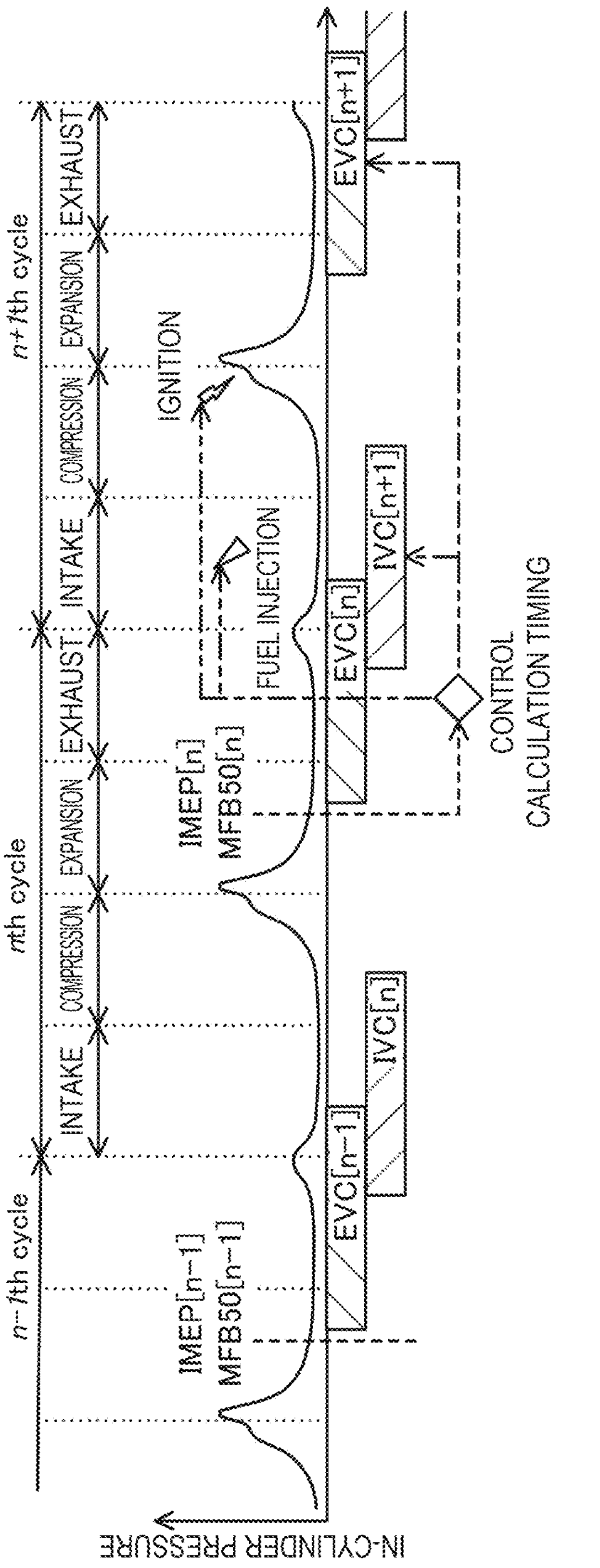
FIG. 10 is a timing chart for control of the engine.

FIG. 10 shows an illustrated example of a timing chart showing the timings at which the controller 100 outputs the control indicating amounts to the devices. The horizontal axis in FIG. 10 indicates the advancing of the crank angle, and the vertical axis indicates the pressure in the cylinder 2, and FIG. 10 shows an example of changes in the pressure in the cylinder 2 over a plurality of combustion cycles. As described above, the controller 100 obtains information about the combustion state (i.e. IMEP[n] and MFB50[n]) in the previous combustion cycle (nth cycle), based on the signal from the pressure sensor SN4, and sets the correction amounts for the devices for the next combustion cycle (n+1th cycle). Since the information about the combustion state can be obtained after the combustion in the previous combustion cycle is finished, the controller 100 can calculate the control indicating amounts before the intake valve 11 of the next combustion cycle is closed (see "control calculation timing" in FIG. 10), and can output the control indicating amounts to the injector 14, the spark plug 13, the intake S-VT 17, and the exhaust S-VT 18 (see the two-dot and dash arrows in FIG. 10). As a result, the controller 100 can adjust, as shown in FIG. 10, the fuel injection amount of the injector 14 for which the injection timing is set in the intake stroke.

(Advantageous Effects of Control)

Figure 11:
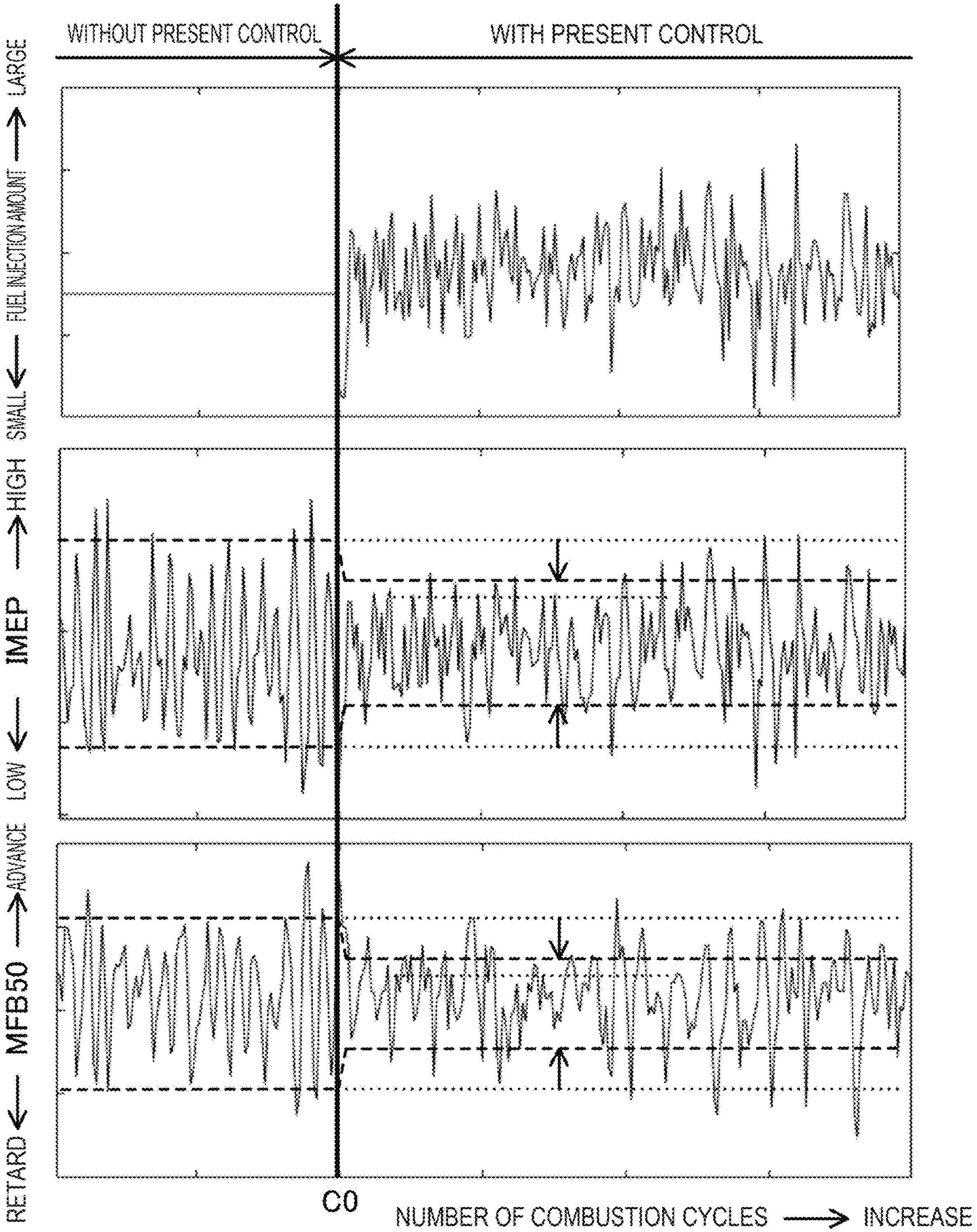
FIG. 11 shows the advantageous effect of engine control disclosed herein.

FIG. 11 shows the advantageous effects of the control of the engine 1 to which the technology disclosed herein is applied. The controller 100 outputs the revised control indicating amount only to the injector 14. In other words, the fuel injection amount by the injector 14 is adjusted to reduce regular combustion variations across combustion cycles.

For example, assuming that an adjustment of the fuel injection amount is made in each of the combustion cycles 1, 2, 3, 4, 5, 6 shown in FIG. 5, how the fuel injection amount is adjusted in each of the combustion cycles 1, 2, 3, 4, 5, 6 will be described. In the combustion cycle 1, since combustion is performed in such a way that the unburned fuel amount increases, the controller 100 makes a correction to decrease the fuel injection amount of the injector 14 as shown on the far right in FIG. 5. Similarly, in the combustion cycle 2 and combustion cycle 3, the controller 100 makes corrections to decrease the fuel injection amount of the injector 14. On the other hand, in the combustion cycle 4, since combustion is performed in such a way that the unburned fuel amount decreases, the controller 100 makes a correction to increase the fuel injection amount of the injector 14. Similarly, in the combustion cycle 5 and combustion cycle 6, the controller 100 makes corrections to increase the fuel injection amount of the injector 14.

The horizontal axis in FIG. 11 indicates the number of combustion cycles. The upper diagram in FIG. 11 shows variations in the fuel injection amount, the middle diagram shows variations in the IMEP, and the lower diagram shows variations in the MFB50. The left side of C0 in FIG. 11 shows variations in parameters when the control for reducing regular combustion variations across combustion cycles (namely, the present control) is not performed. The engine 1 is steadily operated and the fuel injection amount is substantially constant, but the IMEP and MFB50 vary largely. The right side of C0 shows variations in the parameters when the present control is performed. Although the engine 1 is steadily operated, the fuel injection amount varies largely as the fuel injection amount is revised by execution of the present control. On the other hand, it can be seen that the variations in the IMEP and MFB50 are reduced.

Therefore, the technology disclosed herein can reduce regular combustion variations across combustion cycles. Since regular combustion variations across combustion cycles during the steady operation of the engine 1 is reduced, it is possible to expand the HCCI range to the lower load side in the operating range map shown in FIG. 3 by applying the technology disclosed herein to the controller 100. The expansion of the HCCI range improves the fuel efficiency of the engine 1.

Modified Example

Figure 12:
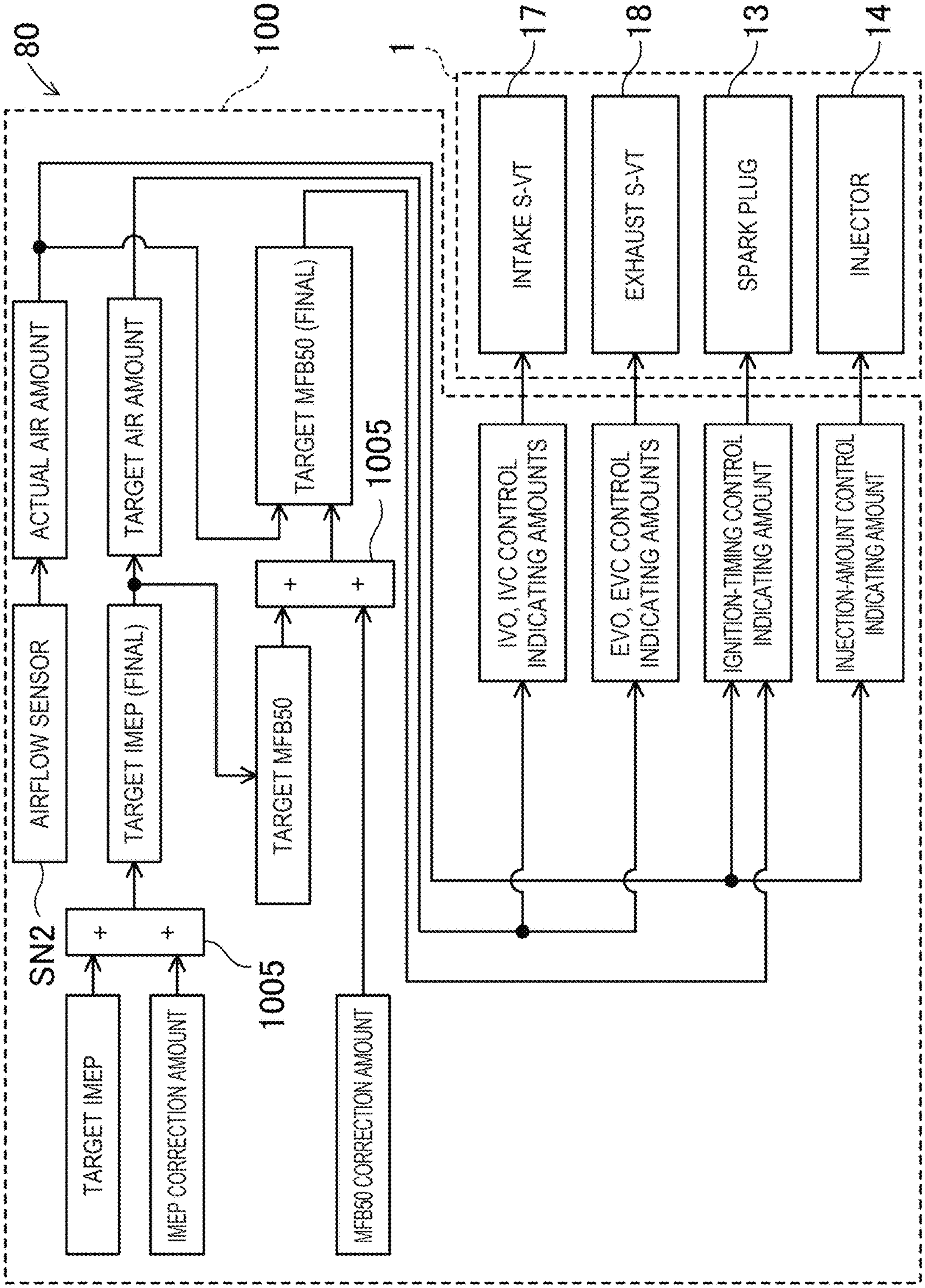
FIG. 12 shows a partial configuration of a control block according to a modified example.

FIG. 12 shows a modified example of the controller 100. This modified example is the example when the engine 1 is operated by SI combustion in which the excess air ratio Λ of the air-fuel mixture is 1. FIG. 12 shows the configuration of the section 80 enclosed by the one-dot and dash line in FIG. 8. The basic controller 1004 outputs a target IMEP. The feedback controller 1003 outputs an IMEP correction amount and a MFB50 correction amount. The adder 1005 adds up the target IMEP and the IMEP correction amount to set a final target IMEP. When the final target IMEP is set, a target air amount to be introduced into the cylinder 2 is determined. The IVO and IVC of the intake valve 11 and the EVO and EVC of the exhaust valve 12 are set on the basis of the target air amount, and an actual air amount based on the measurement signal from the airflow sensor SN2. The controller 100 outputs IVO and IVC control indicating amounts to the intake S-VT 17, and outputs EVO and EVC control indicating amounts to the exhaust S-VT 18. The intake S-VT 17 adjusts the rotational phase of the intake camshaft, and the exhaust S-VT 18 adjusts the rotational phase of the exhaust camshaft.

Moreover, a fuel-injection-amount control indicating amount is set, based on the actual air amount, so that the excess air ratio 2 is 1. The controller 100 outputs the fuel-injection-amount control indicating amount to the injector 14. The injector 14 injects the indicated amount of fuel into the cylinder 2 at a specified timing in the intake stroke and/or the compression stroke.

Furthermore, when the final target IMEP is set, a target MFB50 is set. The adder 1005 adds up the target MFB50 and the MFB50 correction amount. The controller 100 sets a final target MFB50 on the basis of the target MFB50, the MFB50 correction amount, and the actual air amount based on the measurement signal from the airflow sensor SN2. An ignition-timing control indicating amount for the spark plug 13 is set based on the final target MFB50 and the actual air amount. The controller 100 outputs the ignition-timing control indicating amount to the spark plug 13. The spark plug 13 ignites the air-fuel mixture in the cylinder 2 at the indicated timing.

With this control, regular combustion variations across combustion cycles can also be reduced.

Note that, regarding the technology disclosed herein, the controller 100 may output a control indicating amount to at least one device among the intake S-VT 17, the exhaust S-VT 18, the spark plug 13, and the injector 14.

Furthermore, the technology disclosed herein is not limited to the application to the engine 1 having the above-described configuration. The technology disclosed herein is broadly applicable to engines with various configurations.

Figure 13:
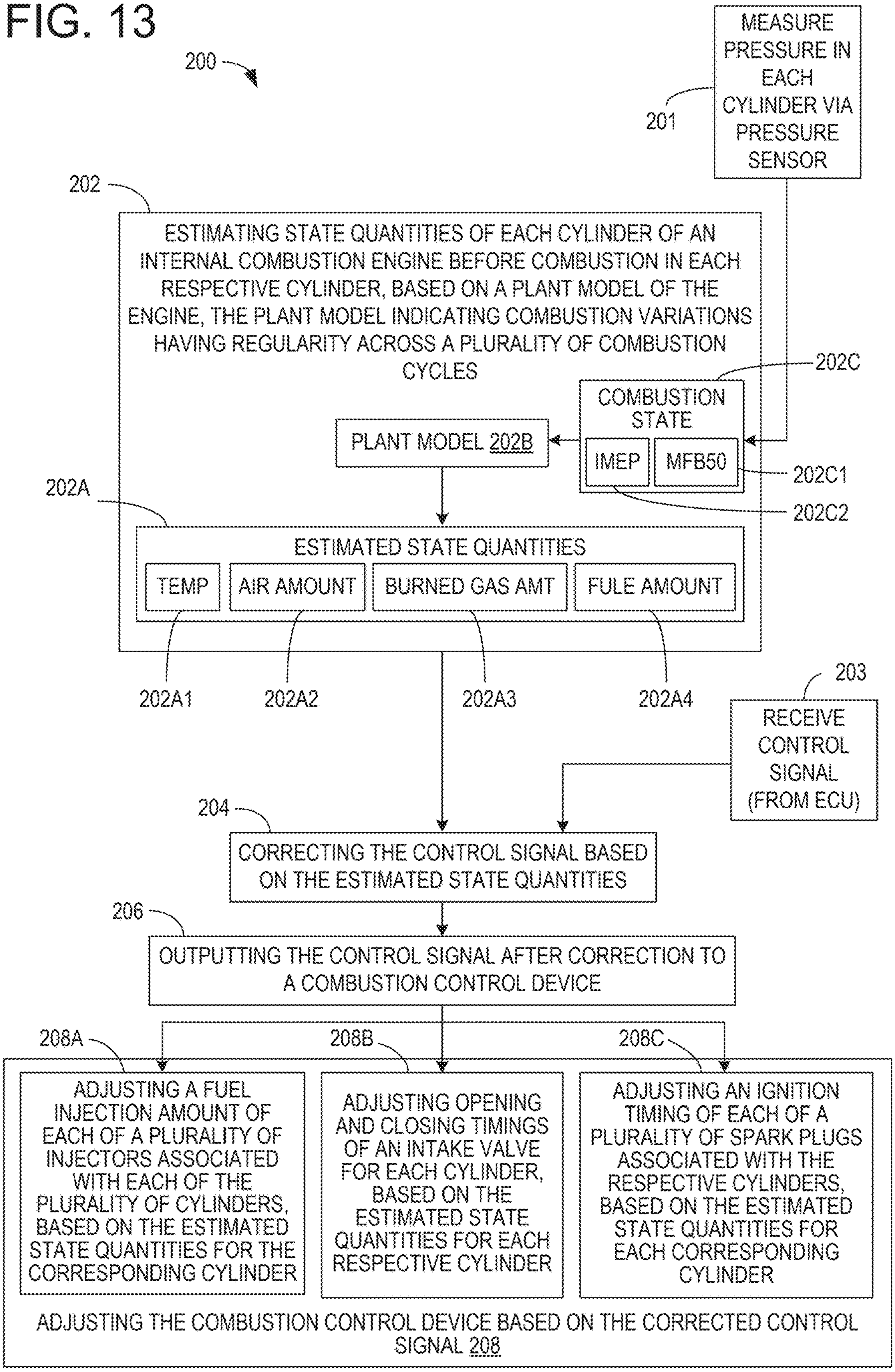
FIG. 13 is a flow chart of an example method for controlling an engine system according to the present disclosure.

FIG. 13 illustrates an engine control method 200 according to one example implementation of the present disclosure. Engine control method 200 can be implemented using the engine system described above, or similar engine system. At 202, the method includes estimating state quantities of each cylinder of an internal combustion engine before combustion in each respective cylinder, based on a plant model 202B of the engine, the plant model 202B indicating combustion variations having regularity across a plurality of combustion cycles. At 204, the method includes correcting a control signal based on the estimated state quantities. At 206, the method includes outputting the control signal after correction to a combustion control device.

The estimating of the state quantities can include estimating the state quantities of each cylinder for each combustion cycle of the cylinder, and the state quantities 202A can include a temperature 202A1, an air amount 202A2, a burned gas amount 202A3, and a fuel amount 202A4, for example.

The plant model 202B can be a combined model of a physical model related to gas exchange in the cylinders and a statistical model related to combustion in the cylinders, as described above.

The estimating of the state quantities of the cylinder in which combustion is performed next can be performed before an intake valve of that cylinder is closed, based on the plant model and a combustion state 202C in the cylinder. The combustion state 202C in turn is based on a signal from a pressure sensor that measures pressure in that cylinder. Thus, as illustrated at 201, the method can include measuring the pressure in each cylinder via the pressure sensor, prior to estimating the state quantities. As shown, the combustion state 202C based on the signal from the pressure sensor can include an indicated mean effective pressure 202C1 and a center of combustion 202C2, for example.

The control signal that is corrected at step 206 is received from an ECU or other processing circuitry that generates a base control signal for driving the combustion control device (s), such as the injectors, intake valves of the valvetrain, and spark plugs. This control signal is received at 203 and corrected at step 206, to thereby generate a corrected control signal, which simply may be referred to as the control signal after correction.

The method 200 can further include, as shown at 208, adjusting the combustion control device based on the corrected output signal. The combustion control device can include, for example, injectors, intake valves of a valvetrain, or spark plugs. Thus, the adjusting of the combustion control can include, as shown at 208A, adjusting a fuel injection amount of each of a plurality of injectors associated with each of the plurality of cylinders, based on the estimated state quantities for the corresponding cylinder. The adjusting of the fuel injection amount of the injectors can occur in an intake stroke of each cylinder. Alternatively or in addition, as shown at 208B, the adjusting of the combustion control device can include adjusting opening and closing timings of an intake valve for each cylinder, based on the estimated state quantities for each respective cylinder. Further, as shown at 208C, the adjusting of the combustion control device can additionally or alternatively include adjusting an ignition timing of each of a plurality of spark plugs associated with the respective cylinders, based on the estimated state quantities for each corresponding cylinder.

The method described above can be implemented to provide the technical benefits discussed above related to reducing the variations in combustion that occur regularly across combustion cycles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTER LIST

1 engine
11 intake valve
12 exhaust valve
13 spark plug
14 injector
100 controller
1000 plant model
2 cylinder
SN4 pressure sensor

The invention claimed is:

1. An engine system comprising:

an engine that has a plurality of cylinders in which gas exchange is performed by opening and closing an intake valve and an exhaust valve of each cylinder, and that is operated by causing the plurality of the cylinders to sequentially execute combustion cycles;

a combustion control device that is attached to the engine, and controls combustion in each of the plurality of cylinders; and a controller that controls an operation of the engine by outputting a control signal to the combustion control device, wherein the controller, before combustion in each of the plurality of cylinders, estimates, based on a plant model of the engine, the plant model indicating combustion variations having regularity across a plurality of the combustion cycles, state quantities of the cylinder, corrects the control signal based on the estimated state quantities, and outputs the control signal after correction to the combustion control device.

2. The engine system according to claim 1, wherein the plant model is a model that estimates the state quantities of the cylinders for each combustion cycle, and the controller estimates a temperature, an air amount, a burned gas amount, and a fuel amount as the state quantities of the cylinders, based on the plant model.

3. The engine system according to claim 2, wherein the plant model is a combined model of a physical model related to gas exchange in the cylinders and a statistical model related to combustion in the cylinders.

4. The engine system according to claim 3, further comprising:

a plurality of pressure sensors that are attached to the engine for each of the plurality of cylinders, and that output a signal corresponding to pressure in each cylinder to the controller, and the controller estimates the state quantities of the cylinder in which combustion is performed next before the intake valve of that cylinder is closed, based on the plant model and a combustion state in the cylinder which is based on the signal from the pressure sensor.

5. The engine system according to claim 4, wherein the combustion state based on the signal from the pressure sensor includes an indicated mean effective pressure and a center of combustion.

6. The engine system according to claim 4, wherein the combustion control device includes a plurality of injectors attached to the engine for each of the plurality of cylinders and that inject fuel to be supplied into each respective cylinder, and the controller adjusts a fuel injection amount of each injector, based on the estimated state quantities for the corresponding cylinder.

7. The engine system according to claim 6, wherein the injectors inject the fuel at least in an intake stroke before the intake valve is closed for each cylinder, and the controller adjusts the fuel injection amount of the injectors in the intake stroke of each cylinder.

8. The engine system according to claim 4, wherein the combustion control device includes an intake valvetrain that changes opening and closing timings of the intake valve for each cylinder, and the controller adjusts the opening and closing timings of the intake valve for each cylinder, based on the estimated state quantities for each respective cylinder.

9. The engine control apparatus according to claim 4, wherein the combustion control device includes a plurality of spark plugs that are attached to the engine for each of the plurality of cylinders and that ignite an air-fuel mixture in each cylinder, and the controller adjusts an ignition timing of each spark plug, based on the estimated state quantities for each corresponding cylinder.

10. The engine system according to claim 2, wherein the engine control apparatus comprises a plurality of pressure sensors that are attached to the engine for each of the plurality of cylinders, and that output a signal corresponding to pressure in each cylinder to the controller, and, the controller estimates the state quantities of the cylinder in which combustion is performed next before the intake valve of that cylinder is closed, based on the plant model and a combustion state in the cylinder which is based on the signal from the pressure sensor.

11. An engine control method, comprising:

estimating state quantities of each cylinder of an internal combustion engine before combustion in each respective cylinder, based on a plant model of the engine, the plant model indicating combustion variations having regularity across a plurality of combustion cycles;

correcting a control signal based on the estimated state quantities;

outputting the control signal after correction to a combustion control device.

12. The engine control method of claim 11, wherein the estimating of the state quantities includes estimating the state quantities of each cylinder for each combustion cycle of the cylinder, and the state quantities include a temperature, an air amount, a burned gas amount, and a fuel amount.

13. The engine control method of claim 11, wherein the plant model is a combined model of a physical model related to gas exchange in the cylinders and a statistical model related to combustion in the cylinders.

14. The engine control method of claim 13, wherein the estimating of the state quantities of the cylinder in which combustion is performed next is performed before an intake valve of that cylinder is closed, based on the plant model and a combustion state in the cylinder, which is based on a signal from a pressure sensor that measures pressure in that cylinder.

15. The engine control method according to claim 14, wherein the combustion state based on the signal from the pressure sensor includes an indicated mean effective pressure and a center of combustion.

16. The engine control method according to claim 14, further comprising:

adjusting a fuel injection amount of each of a plurality of injectors associated with each of the plurality of cylinders, based on the estimated state quantities for the corresponding cylinder.

17. The engine control method according to claim 16, wherein the adjusting of the fuel injection amount of the injectors occurs in an intake stroke of each cylinder.

18. The engine control method according to claim 14, wherein adjusting opening and closing timings of an intake valve for each cylinder, based on the estimated state quantities for each respective cylinder.

19. The engine control apparatus according to claim 14, wherein adjusting an ignition timing of each of a plurality of spark plugs associated with the respective cylinders, based on the estimated state quantities for each corresponding cylinder.

* * * * *